United States Patent
Kobayashi

(10) Patent No.: US 12,437,547 B2
(45) Date of Patent: Oct. 7, 2025

(54) IMAGE PROCESSING METHOD

(71) Applicant: TOYOTA JIDOSHA KABUSHIKI KAISHA, Toyota (JP)

(72) Inventor: Naofumi Kobayashi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/490,084

(22) Filed: Oct. 19, 2023

(65) Prior Publication Data

US 2024/0193954 A1    Jun. 13, 2024

(30) Foreign Application Priority Data

Dec. 8, 2022 (JP) .................................. 2022-196578

(51) Int. Cl.
| | | |
|---|---|---|
| *G06V 20/54* | (2022.01) | |
| *G06T 3/40* | (2006.01) | |
| *G06T 7/90* | (2017.01) | |
| *G06V 10/56* | (2022.01) | |
| *H04N 1/40* | (2006.01) | |

(52) U.S. Cl.
CPC ................ *G06V 20/54* (2022.01); *G06T 3/40* (2013.01); *G06T 7/90* (2017.01); *G06V 10/56* (2022.01); *H04N 1/40012* (2013.01); *G06T 2207/10024* (2013.01)

(58) Field of Classification Search
CPC .......... G06V 20/54; G06V 10/56; G06T 3/40; G06T 7/90; G06T 2207/10024; H04N 1/40012; H04N 7/181; H04N 23/84; H04N 23/95
See application file for complete search history.

(56) References Cited

U.S. PATENT DOCUMENTS

| | | | | |
|---|---|---|---|---|
| 2005/0110621 A1* | 5/2005 | Hahn | ............ | G02B 23/12 348/E7.086 |
| 2014/0132707 A1* | 5/2014 | Hashimoto | .......... | H04N 13/239 348/36 |
| 2015/0294167 A1* | 10/2015 | Zhang | .................. | G06V 20/584 382/103 |
| 2016/0032148 A1* | 2/2016 | Amako | .................... | C08L 83/04 156/60 |
| 2016/0092742 A1* | 3/2016 | Chen | .................... | G06V 20/584 382/103 |
| 2016/0148063 A1* | 5/2016 | Hong | .................... | G06V 20/582 382/103 |
| 2016/0328619 A1* | 11/2016 | Yi | .......................... | B60W 10/22 |
| 2019/0303698 A1* | 10/2019 | Hwangbo | ............ | G06V 30/274 |

(Continued)

FOREIGN PATENT DOCUMENTS

| | | |
|---|---|---|
| JP | 2013-8070 A | 1/2013 |
| JP | 6317914 B2 | 4/2018 |
| JP | 2020-95325 A | 6/2020 |

*Primary Examiner* — Timothy R Newlin
(74) *Attorney, Agent, or Firm* — Sughrue Mion, PLLC

(57) ABSTRACT

An image processing method is an image processing method for processing a color image imaged by an imager which images traffic conditions around a vehicle. The image processing method includes keeping a first image portion corresponding to a first range, which is smaller than a range imaged by the imager, of the color image in color, and converting a second image portion, which includes at least a second range other than the first range of the color image, into monochrome.

7 Claims, 3 Drawing Sheets

(56) References Cited

U.S. PATENT DOCUMENTS

| | | | |
|---|---|---|---|
| 2022/0408062 A1* | 12/2022 | Goto .................. | H04N 7/181 |
| 2023/0196790 A1* | 6/2023 | Philipp ............... | G06V 10/56 |
| | | | 382/103 |
| 2024/0312223 A1* | 9/2024 | Kakita ................ | G06V 10/56 |

* cited by examiner

IMAGE PROCESSING METHOD

INCORPORATION BY REFERENCE

This application is based upon and claims the benefit of priority from Japanese Patent Application No. 2022-196578, filed on Dec. 8, 2022, the disclosure of which is incorporated herein in its entirety by reference.

TECHNICAL FIELD

This disclosure relates to an image processing method.

BACKGROUND ART

As this kind method, for example, there is a method for recording images based on brightness of a part, which includes a vehicle interior, of image frame corresponding to an image signal output from a vehicle mounted camera wherein a color image is recorded when surroundings are bright, such as during the daytime, wherein a monochrome image is recorded when surroundings are dark, such as at night (see Patent Literature 1).

PRIOR ART DOCUMENTS

Patent Literature

Patent Literature 1: JP 6317914 B

In the technique described in Patent Literature 1, one of color and monochrome is selected according to brightness of surroundings of a vehicle. However, there are cases in which selecting a monochrome image is inappropriate when surroundings of a vehicle are dark. By the way, there is a technique for colorizing a monochrome image by using an operation model built by machine learning. However, there are cases in which original color is not reproduced by colorization.

This disclosure, in view of the above problems, aims at providing an image processing method for appropriately recording color images.

SUMMARY

An image processing method according to one aspect of this disclosure is an image processing method for processing a color image imaged by an imager which images traffic conditions around a vehicle, the image processing method including: keeping a first image portion corresponding to a first range, which is smaller than a range imaged by the imager, of the color image in color; and converting a second image portion, which includes at least a second range other than the first range of the color image, into monochrome.

EXAMPLE EMBODIMENTS

Figure 1:
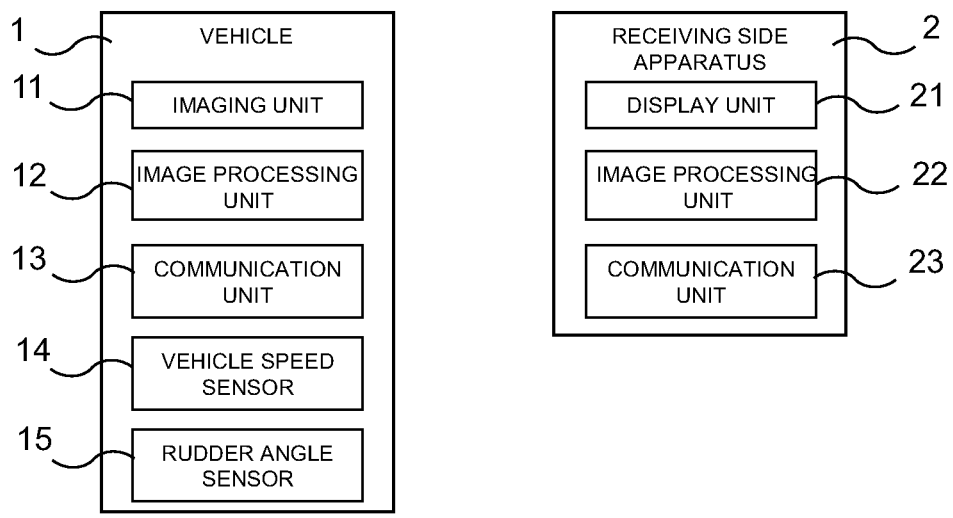
FIG. 1 is a block diagram showing configurations of a vehicle and a receiving side apparatus according to an embodiment.

Referring to FIGS. 1 to 5, an embodiment of an image processing method will be described. In FIG. 1, a vehicle 1 includes an imaging unit 11, an image processing unit 12, a communication unit 13, a vehicle speed sensor 14, and a rudder angle sensor 15. A receiving side apparatus 2 includes a display unit 21, an image processing unit 22, and a communication unit 23. Incidentally, the receiving side apparatus 2 may not include the display unit 21. The vehicle 1 and the receiving side apparatus 2 may communicate with each other, via communication units 13 and 23. The vehicles 1 may be capable of communicating with the receiving apparatus 2 via the internet. That is, the vehicle 1 may be a connected car.

The imaging unit 11 is disposed capable of imaging outside of the vehicle 1. The imaging unit 11 may image traffic conditions around the vehicle 1. The traffic conditions may include information useful for running the vehicle 1. The information useful for running the vehicle 1 may be information indicative of at least one of traffic lights, traffic signs, road signs, lanes, other vehicles, pedestrians and obstacles. The vehicle speed sensor 14 detects the vehicle speed of the vehicle 1. The rudder angle sensor 15 detects a rudder angle of the vehicle 1 (for example, a rudder angle of a wheel). Incidentally, the imaging unit 11, the vehicle speed sensor 14 and the rudder angle sensor 15, it is possible to apply various existing aspects. Therefore, detailed description of the imaging unit 11, the vehicle speed sensor 14 and the rudder angle sensor 15 will be omitted.

The image processing unit 12 of the vehicle 1 performs a predetermined image processing on an image in color imaged by the imaging unit 11. The image processing unit 12 transmits the image, which has been subjected to image processing, to the receiving side apparatus 2 via the communication unit 13.

The following techniques are known as techniques for transmitting images in real time. Performing monochrome processing to images in order to maintain image resolution and frame rate while reducing the bandwidth used by wireless communications. There is a technique for estimating color information related to monochrome images using a learned neural network.

By combining these techniques, the following are possible. First, a monochrome image is generated by applying monochrome processing to a color image imaged by a first apparatus. Then, the monochrome image is transmitted from the first apparatus to a second apparatus. Next, in the second apparatus, color information relating to the monochrome image is estimated. As a result, the monochrome image transmitted from the first apparatus can be viewed as a color image in the second apparatus. In addition, the use band of wireless communication can be reduced.

However, the color information of the image estimated using the neural network is not always the same as the original color. On the other hand, an image imaged by the imaging unit 11 of the vehicle 1 includes an object of which color is important. The object, of which color is important, may include traffic lights and/or traffic signs. The object, of which color is important, may include a line that defines a lane. It cannot ensure that color of the object, of which color is important, is correctly estimated by using a neural network.

Figure 2:
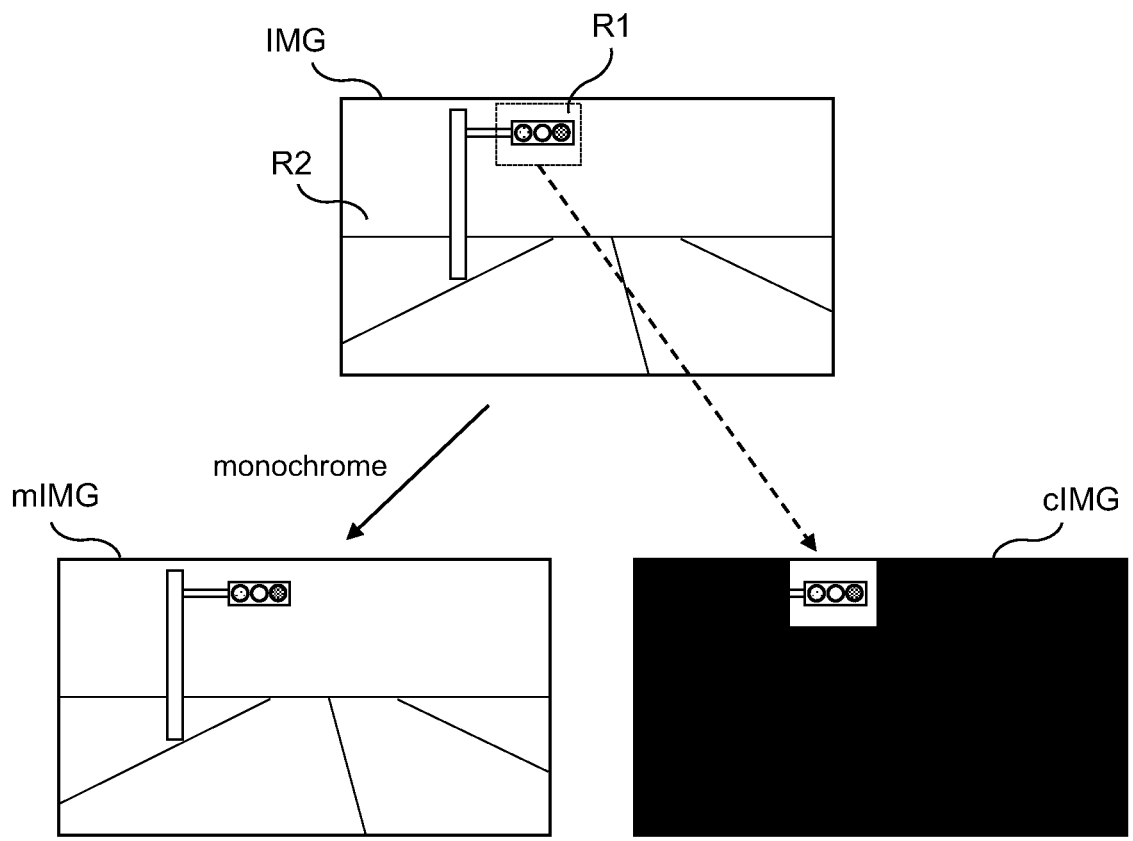
FIG. 2 is a conceptual scheme showing a concept of an image processing according to the embodiment.

In view of the above-described circumstances, the image processing unit 12 of the vehicle 1 performs the following image processing. In FIG. 2, an image IMG is an exemplary image imaged by the imaging unit 11. The image IMG includes a traffic light. The image processing unit 12 extracts an object, of which color is important, based on the image IMG. At this time, the image processing unit 12 may use an operation model which extracts an object, of which color is important, when the image IMG is inputted. The operation model may be an operation model using a neural network. The neural network may be a convolutional neural network (CNN).

The image processing unit 12 may use a plurality of operation models as the operation model for extracting an object of which color is important. In this case, the image processing unit 12 may select one operation model from the plurality of operation models based on imaging conditions of the imaging unit 11. Imaging conditions may include at least one of geographical, weather, time of day, and specific events. A condition of geographic may include at least one of a road type and a country. A condition for specific events may include disasters. The plurality of operation models may be optimized so that an object, of which color is important, can be extracted from an image imaged under a corresponding imaging condition.

The image processing unit 12 may extract a traffic light as an object, of which color is important, from the image IMG. The image processing unit 12 determines a range R1 including the extracted traffic light. The size of the range R1 will be described later. The image processing unit 12 extracts an image area corresponding to the range R1 from the image IMG as a color image cIMG. The image processing unit 12 may generate the color image cIMG by changing a pixel value of image area other than the range R1 in the image IMG to a value corresponding to black or white.

The image processing unit 12 applies a monochrome processing an image area including a range R2, which is a range other than the range R1 of the image IMG. As a result, the image processing unit 12 generates a monochrome image mIMG. FIG. 2 shows an example in which the monochrome image mIMG is generated by applying the monochrome processing to the whole of the image IMG.

Here, the range R1 is further described. An imaging period (in other words, frame rate) of the imaging unit 11 is constant. When the vehicle 1 is running, the positional relationship between the vehicle 1 and an object, of which color is important, changes. Therefore, depending on a status of the vehicle 1, a position of an object included in an image at a first time and the position of the object included in an image at a second time after the first time may differ significantly. In other words, the object may move greatly in an image depending on the status of the vehicle 1. If an object moves significantly in an image, it may take a lot of time for an object, of which color is important, to be extracted. When a lot of time is required to extract an object of which color is important, it becomes difficult to transmit an image in real time.

The image processing unit 12 may determine the size of the range R1 based on the state quantity of the vehicle 1. The state quantity of the vehicle 1 may include at least one of a vehicle speed and a rudder angle of the vehicle 1. When the vehicle 1 moves forward, an object in front of the vehicle 1 approaches the vehicle 1. In this case, a size of the object in image becomes larger as the vehicle 1 approaches the object. The higher the vehicle speed of the vehicle 1 is, the faster the vehicle 1 approaches the object. When the vehicle 1 turns, an object in image move in an opposite direction to the turning direction of the vehicle 1. In this case, the distance of the object in image changes according to the rudder angle and the vehicle speed of the vehicle 1. When the vehicle speed of the vehicle 1 is constant, the greater the rudder angle is, the greater the moving distance of the object in image is. In addition, when the rudder angle is constant, the higher the vehicle speed of the vehicle 1 is, the greater the moving distance of the object in image is. For this reason, the image processing unit 12 may increase the size of the range R1 as the vehicle speed of the vehicle 1 detected by the vehicle speed sensor 14 increases. The image processing unit 12 may increase the size of the range R1 as the rudder angle detected by the rudder angle sensor 15 increases.

Figure 3:
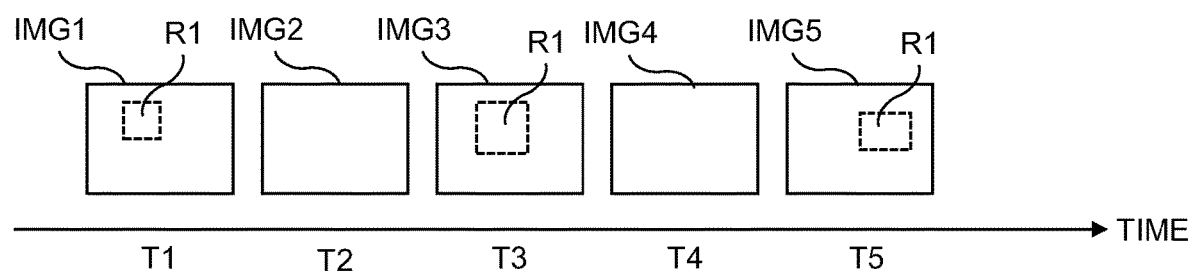
FIG. 3 is a conceptual scheme showing a concept of the image processing according to the embodiment.

The image processing unit 12 may perform the following processing. In FIG. 3, the image processing unit 12 may extract an object, of which color is important, from an image IMG1 imaged at a time T1. The image processing unit 12 may set the range R1 for the image IMG1. The image processing unit 12 may generate a color image cIMG based on the range R1 of image IMG1. The image processing unit 12 does not need to extract an object, of which color is important, from an image IMG2 imaged at a time T2. In this case, the image processing unit 12 may generate a color image cIMG from the image IMG2 based on the range R1 of the image IMG1. The image processing unit 12 may extract an object, of which color is important, from an image IMG3 imaged at a time T3. The image processing unit 12 may set the range R1 for the image IMG3. The image processing unit 12 may generate a color image cIMG based on the range R1 of the image IMG3. The image processing unit 12 does not need to extract an object, of which color is important, from an image IMG4 imaged at a time T4. In this case, the image processing unit 12 may generate a color image cIMG from the image IMG4 based on the range R1 of the image IMG3. The image processing unit 12 may extract an object, of which color is important, from an image IMG5 imaged at a time T5. The image processing unit 12 may set a range R1 for the image IMG5. The image processing unit 12 may generate a color image cIMG based on the range R1 of the image IMG5.

According to processing described above, it is possible to reduce the number of times processing is performed to extract an object of which color is important. For this reason, it is possible to ensure the appropriate processing for extracting an object of which color is important. The image processing unit 12 may determine the size of the range R1 based on the state quantity of the vehicle 1. Therefore, even if the number of times of performing processing for extracting an object, of which color is important, is reduced, the image processing unit 12 can generate the color image cIMG including an object of which color is important. As a result, it is possible to achieve both extraction of an object, of which color is important, and transmission of images in real time.

Figure 4:
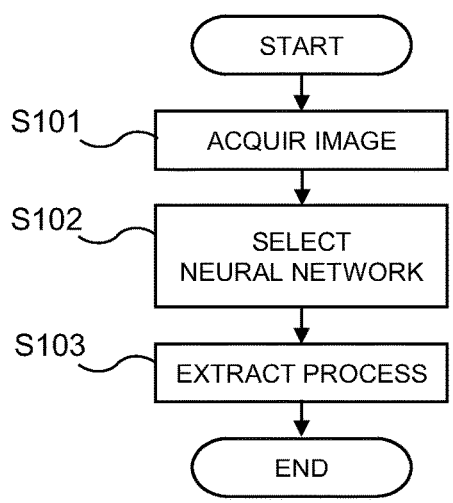
FIG. 4 is a flowchart showing an operation of an image processing unit according to the embodiment.
Figure 5:
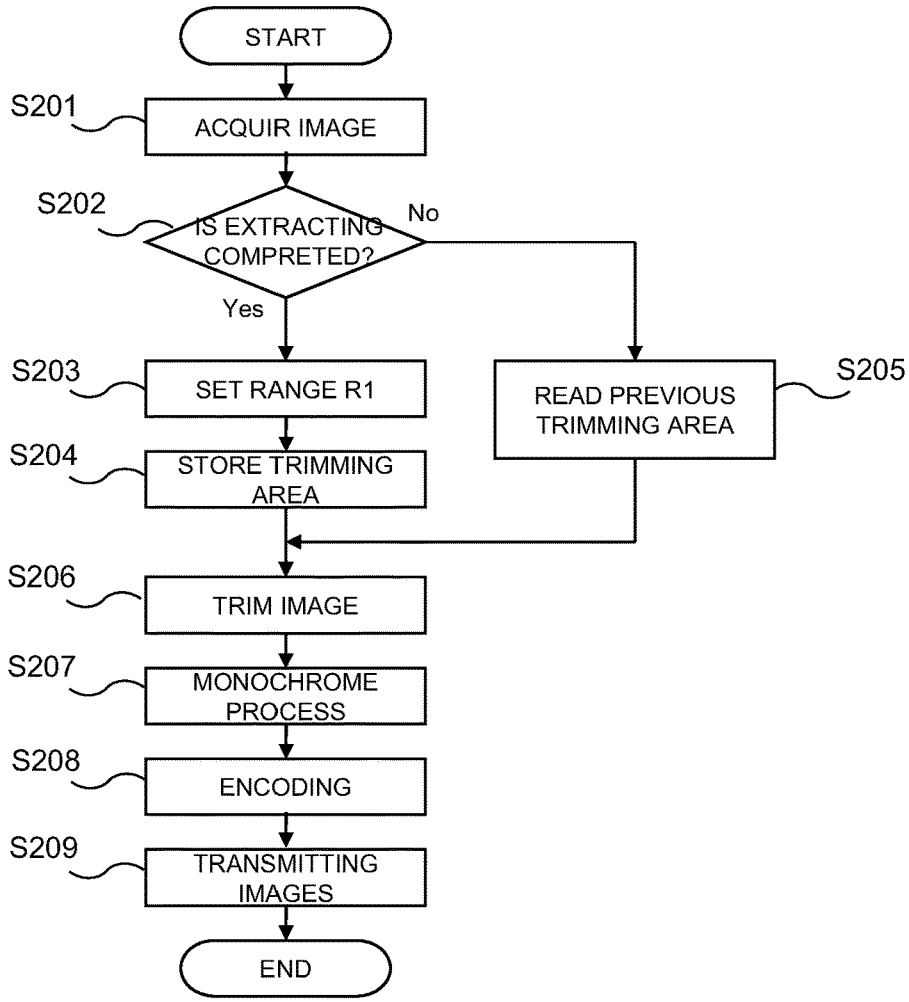
FIG. 5 is a flowchart showing an operation of the image processing unit according to the embodiment.

Referring to the flowcharts of FIGS. 4 and 5, the image processing unit 12 of the vehicle 1 will be further described. In FIG. 4, the image processing unit 12 acquires image imaged by the imaging unit 11 (step S101). The image processing unit 12 may select one operation model from a plurality of operation models on the basis of the imaging conditions of the imaging unit 11 (step S102). The operation model is an operation model for extracting an object, of which color is important, from an image. The operation model may be an operation model using a neural network. The image processing unit 12 performs extraction processing of extracting an object, of which color is important, from an image using the selected operation model (step S103).

The operation shown by the flowchart of FIG. 4 may be performed repeatedly in a longer period than the operation shown by a flowchart of FIG. 5 described below.

In FIG. 5, the image processing unit 12 acquires an image imaged by the imaging unit 11 (step S201). The image processing unit 12 determines whether or not the extracted processing has been completed on the image acquired in the process of the step S201 (step S202). In the process of the step S202, when it is determined that the extracted processing has been completed (step S202: Yes), the image processing unit 12 sets a range R1 for the image acquired in the process of the step S201 on the basis of the state quantity of the vehicle 1 (step S203). The image processing unit 12 stores the range R1 (step S204). The image processing unit 12 may be referred to as the range R1 because an image area corresponding to the range R1 is trimmed as the color image cIMG, and thus it may be referred to as a trimming area.

In the process of the step S202, when it is determined that the extracted processing is not completed (step S202: No), the image processing unit 12 reads a previous range R1 (step S205). Note that the previous range R1 means the range R1 stored in the process of the step S204 of the previous cycle of the operation shown in the flow chart of FIG. 5.

After the process of the step S204 or the step S205, the image processing unit 12 extracts a color image area corresponding to the range R1 from the image acquired in the process of the step S201 as the color image cIMG (step S206). In parallel with the process of the step S206, the image processing unit 12 performs the monochrome processing on an image area including at least the range R2, which is a range other than the range R1 of the image acquired in the process of the step S201 (step S207). The process of the step S207 generates the monochrome image mIMG.

Thereafter, in order to transmit the image signal to the receiving side apparatus 2, the image processing unit 12 performs encoding the color image cIMG and the monochrome image mIMG (step S208). The image processing unit 12 transmits the color image cIMG and the monochrome image mIMG, to which the encoded processing is applied, to the receiving side apparatus 2 through the communication unit 13 (step S209). The operation shown by the flowchart of FIG. 5 may be performed repeatedly in a period equal to or less than the imaging period of the imaging unit 11.

Figure 6:
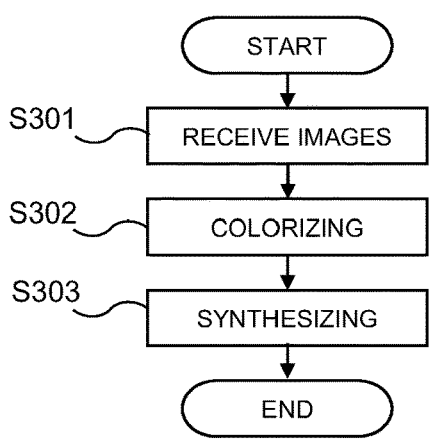
FIG. 6 is a flowchart showing an operation of the receiving side apparatus according to the embodiment.

The receiving side apparatus 2 will be described with reference to the flowchart of FIG. 6. In FIG. 6, the receiving side apparatus 2 receives the color image cIMG and the monochrome image mIMG through the communication unit 23 (step S301). The image processing unit 22 of the receiving side apparatus 2 estimates the color information related to the monochrome image mIMG using the learned neural network. The image processing unit 22 applies a colorant processing to the monochrome image mIMG based on the estimated color information. (step S302). The process of the step S302 colorizes the monochrome image mIMG. The image processing unit 22 combines the colorized monochrome image mIMG and the color image cIMG to generate a single image (step S303). Image generated in the process of the step S303 may be displayed on the display unit 21.

The receiving side apparatus 2 may be implemented by at least one of a personal computer, a tablet terminal, and a smartphone. Alternatively, the receiving side apparatus 2 may be implemented by a server apparatus (for example, a cloud server). In this case, the receiving side apparatus 2 may not include the display unit 21. The server apparatus as the receiving side apparatus 2 may send an image generated in the process of the step S303 to a terminal apparatus through the communication unit 23. The terminal apparatus may be at least one of a personal computer, a tablet terminal, and a smartphone.

(Technical Effect)

The image processing unit 12 of the vehicle 1 cuts out an image area corresponding to the range R1 including an object, of which color is important, as the color image cIMG. On the other hand, the image processing unit 12 generate the monochrome image mIMG by applying the monochrome processing to an image area including at least the range R2. The image processing unit 12 transmits the color image cIMG and the monochrome image mIMG to the receiving side apparatus 2. The percentage of the range R1 in the total image is relatively small. Therefore, the data-size of the color image cIMG is relatively small. Therefore, according to the image processing unit 12, the resolution and the frame rate of the image can be maintained while reducing the use band of the wireless communication. As a result, the image processing unit 12 can transmit images to the receiving side apparatus 2 in real time.

The image processing section 22 of the receiving side apparatus 2 converts the monochrome image mIMG into color and combines it with the color image cIMG. At this time, the color of the object, of which color is important, in the color image cIMG is the same as that of the original image. Therefore, in image synthesized by the image processing unit 22, it can be ensured that the color of the object, of which color is important, is the same as that of the original image. Therefore, according to the present embodiment, it is possible to appropriately record and transmit a color image.

Aspects of the invention derived from the embodiments described above are described below.

An image processing method according to an aspect of this disclosure is an image processing method for processing a color image imaged by an imager which images traffic conditions around a vehicle, the image processing method including: keeping a first image portion corresponding to a first range, which is smaller than a range imaged by the imager, of the color image in color; and converting a second image portion, which includes at least a second range other than the first range of the color image, into monochrome.

In the above-described embodiment, the "range R1" corresponds to an example of the "first range", the "range R2" corresponds to an example of the "second range", the "color image cIMG" corresponds to an example of the "first image portion", and the "monochrome image mIMG" corresponds to an example of the "second image portion".

The image processing method may include determining a size of the first range based on state quantity of the vehicle. Here, the state quantity may be a vehicle speed of the vehicle. The higher the vehicle speed is, the larger the size of the first range may be. Further, the state quantity may be a rudder angle of the vehicle. The larger the rudder angle is, the larger the size of the first range may be.

The image processing method may include transmitting the first image portion kept in color and the second image portion converted into monochrome to an external device, which is different from the vehicle; and the external device colorizing the second image portion converted into monochrome, and synthesizing the first image portion kept in color and the colorized second image portion.

This disclosure is not limited to the embodiments described above. This disclosure can be appropriately modified in range which is not contrary to the gist or the philosophy of the invention which can be read from range and the specification of the patent claim. Image processing methods with such modifications are also included in the technical range of this disclosure.

DESCRIPTION OF REFERENCE SIGNS

1 Vehicle
2 Receiving side apparatus
11 Imaging unit
12, 22 Image processing unit
13, 23 Communication unit
14 Vehicle speed sensor
15 Rudder angle sensor
21 Display unit

What is claimed is:

1. An image processing method for processing a color image imaged by an imager which images traffic conditions around a vehicle, the image processing method including:
    keeping a first image portion corresponding to a first range, which is smaller than a range imaged by the imager, of the color image in color;
    converting a second image portion, which includes at least a second range other than the first range of the color image, into monochrome;
    transmitting the first image portion kept in color and the second image portion converted into monochrome to an external device, which is different from the vehicle; and
    the external device colorizing the second image portion converted into monochrome, and synthesizing the first image portion kept in color and the colorized second image portion.

2. The image processing method according to claim 1, further including determining a size of the first range based on state quantity of the vehicle.

3. The image processing method according to claim 2, wherein
    the state quantity is a vehicle speed of the vehicle, and
    the higher the vehicle speed is, the larger the size of the first range is.

4. The image processing method according to claim 2, wherein
    the state quantity is a rudder angle of the vehicle, and
    the larger the rudder angle is, the larger the size of the first range is.

5. The image processing method according to claim 3, wherein
    the state quantity is a rudder angle of the vehicle, and
    the larger the rudder angle is, the larger the size of the first range is.

6. An image processing method for processing a color image imaged by an imager which images traffic conditions around a vehicle, the image processing method including:
    keeping a first image portion corresponding to a first range, which is smaller than a range imaged by the imager, of the color image in color;
    converting a second image portion, which includes at least a second range other than the first range of the color image, into monochrome; and
    determining a size of the first range based on state quantity of the vehicle;
    wherein
    the state quantity is a vehicle speed of the vehicle, and
    the higher the vehicle speed is, the larger the size of the first range is.

7. The image processing method according to claim 6, wherein
    the state quantity is a rudder angle of the vehicle, and
    the larger the rudder angle is, the larger the size of the first range is.

* * * * *